United States Patent [19]

Wischer et al.

[11] 4,008,058

[45] Feb. 15, 1977

[54] APPARATUS FOR REGENERATING A DRYING AGENT IN DRIERS FOR GASES OR AIR UNDER POSITIVE PRESSURE

[76] Inventors: Karl Wischer, Alaryds mellangard, 560 10 Skillingaryd; Kjell Eric Ericsson, Bruksgatan 30, 560 12 Vaggeryd, both of Sweden

[22] Filed: Mar. 17, 1976

[21] Appl. No.: 667,805

[30] Foreign Application Priority Data

Mar. 18, 1975 Sweden .............................. 7503034

[52] U.S. Cl. .................................... 55/179; 55/208
[51] Int. Cl.² ......................................... B01D 53/04
[58] Field of Search .............. 55/33, 35, 62, 74, 75, 55/179, 208, 269, 387, 389

[56] References Cited

UNITED STATES PATENTS

| | | | |
|---|---|---|---|
| 2,450,289 | 9/1948 | Marek | 55/208 X |
| 2,975,860 | 3/1961 | Westeren | 55/33 X |
| 3,103,425 | 9/1963 | Meyer | 55/62 |
| 3,850,592 | 11/1974 | Huffman | 55/208 X |
| 3,902,875 | 9/1975 | Bridigum et al. | 55/179 X |

Primary Examiner—Frank A. Spear, Jr.
Assistant Examiner—Robert H. Spitzer
Attorney, Agent, or Firm—Sughrue, Rothwell, Mion, Zinn & Macpeak

[57] ABSTRACT

Apparatus comprising two drying towers, each including a drying agent for drying compressed gas or compressed air that is caused to flow through the drying towers alternately. A minor quantity of the dried gas or air expelled from one of the towers is fed back into the other tower for drying the drying agent therein. The feedback element in each tower is an elongate hollow cartridge, through which said minor quantity of dried air flows and thereafter is conveyed to outside the drying agent, subsequently penetrating the latter and being discharged at the end opposite to that at which it has been introduced. A pair of perforated plates may be located in each tower for enclosing the drying agent between them to create a homogenous flow of the compressed gas or compressed air to be dried. Said cartridges may to advantage be located approximately centrally in the respective towers.

7 Claims, 1 Drawing Figure

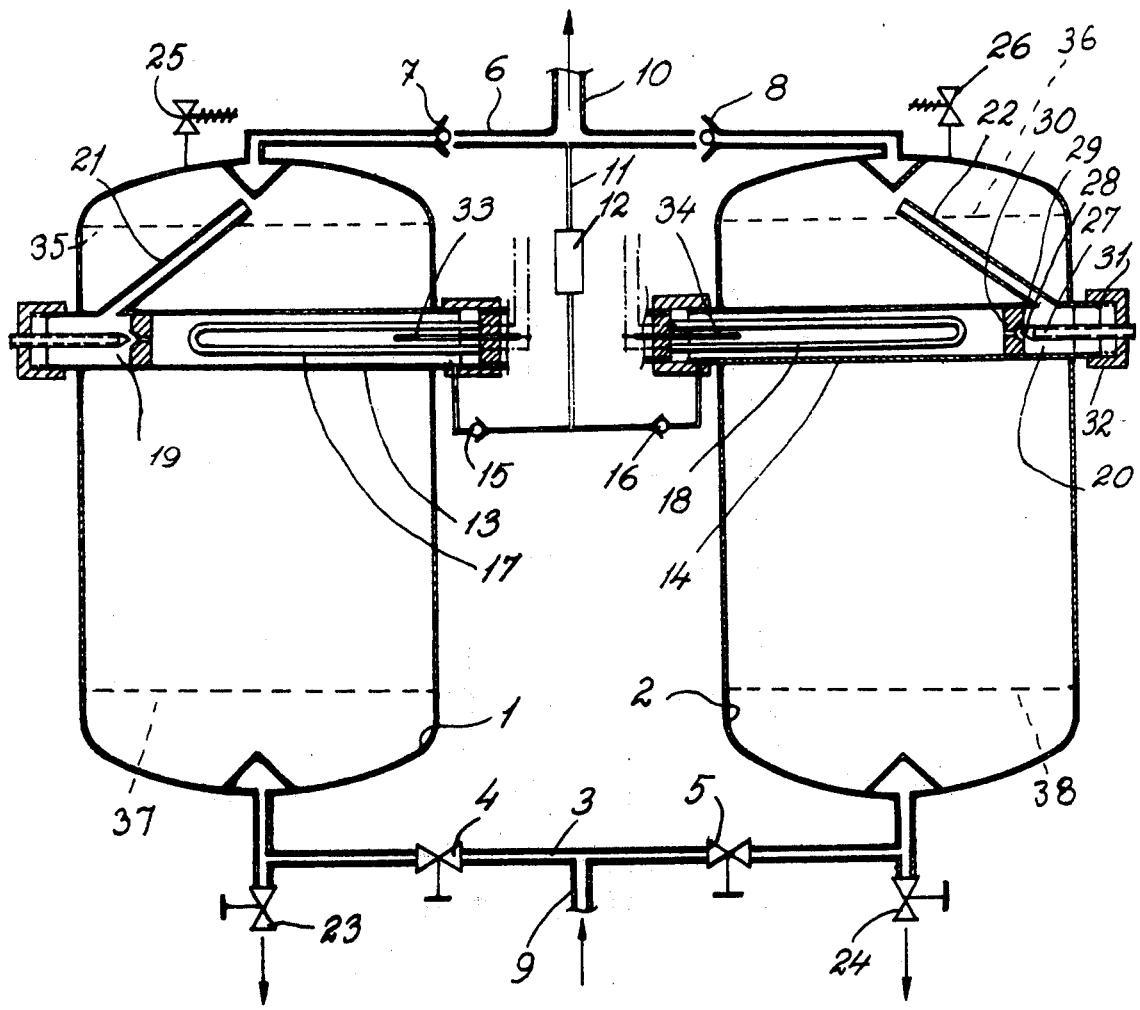

APPARATUS FOR REGENERATING A DRYING AGENT IN DRIERS FOR GASES OR AIR UNDER POSITIVE PRESSURE

BACKGROUND OF THE INVENTION

1. Field of the Invention

This invention refers to apparatus for regenerating a drying agent in driers for gases and air under positive pressure.

Although the invention is equally applicable to both gases and air under positive pressure it will be more particularly described here in connection with compressed air.

As used herein, the term gas is intended to include but not be restricted to air.

Compressed air in utilized to a continually greater extent in various fields, for example in the engineering industry and in vehicles, such as trucks, buses, trains, etc. Increased requirements with regard to dryness and purity are placed on the compressed air that is utilized in these connections, as in practice it has proved that if the compressed air is too moist or contaminated it may cause unnecessary wear to tools and machines operated by it. In order to prevent this damaging effect as the result of moisture the compressed air is made to flow through so-called drying towers in which moisture is removed so that the compressed air exiting from the tower is substantially dryer than the compressed air that was introduced into it. The drying towers may contain various types of hydroscopic mass or a drying agent. When moist air to be dried flows through the drying towers its moisture is given off to the drying agent, and the drying agent therefore has to be regenerated, i.e. dried out, so that it may be utilized again. Such drying can for example be performed by conveying part of the dried air leaving a predetermined drying tower to another drying tower which contains a drying agent which is to be dried, wherein this supplied air is permitted to pass through the drying tower and to absorb moisture from the drying agent before the relevant air is delivered from this second drying tower.

2. Description of the Prior Art

In known structures of the relevant type heating of the compressed air that is utilized for removing moisture from a drying agent has been carried out for example by disposing an electric heating coil directly in the moisture-absorbing mass in the drying towers or alternatively by placing a heating coil in a container located outside the drying tower and permitting the heating coil to heat the air contained in said container, whereafter this air is introduced into the drying towers as drying air. However, in the first-mentioned of these cases, the disadvantage occurs that in practice the heating coil corrodes fairly soon, whereas the second solution is uneconomical, as it results in a substantial loss of heat.

SUMMARY OF THE INVENTION

The object of the present invention is to eliminate the above-mentioned drawbacks and to provide apparatus for regenerating a drying agent in driers for gases or air under positive pressure, said apparatus comprising (a) two drying towers, (b) a drying agent disposed in each of said drying towers, (c) means for interconnecting said drying towers at their respective ends, (d) valve means in said interconnecting means, (e) means for supplying to one of said interconnecting means compressed gas or compressed air to be dried, (f) means for expelling from the other of said interconnecting means dried compressed gas or compressed air, (g) hollow cartridge means extending diametrically through each of said drying towers, (h) heating means disposed in each of said cartridge means, (i) feedback means from each of said drying towers to the respective cartridge means, and (j) valve means in said feedback means, whereby moist, compressed gas or compressed air introduced at one end of a first one of said drying towers is expelled at the other end of said drying tower and a lesser portion of this dried air is fed back as regenerating gas or air to the cartridge means of the second drying tower and heated therein and is discharged from said cartridge means for flowing through the entire drying agent of the second drying tower for drying said drying agent of the second drying tower. The apparatus of the invention is resistive to corrosion and has lower heat losses than previously known structures. The relevant apparatus may to advantage include a choke means located at the opposite end of said heating cartridge as compared to the input end for the regenerating gas or air, said choke means comprising a tapered pin adapted to be threaded into and threaded out of, respectively, an aperture in a blocking disc for controlling the amount of regenerating gas or air flowing through said aperture. The cartridge does not necessarily have to be disposed in the position shown in the figure, as it should be placed at the most favorable level for utilizing radiant heat, for instance centrally in the bed of drying agent. In order to provide a favorable distribution of the flow of compressed gas or air, the drying bed may be disposed between two perforated plates in the towers, with the mutual distance between said plates being dependent of the composition and quantity of the drying agent. Additional features may be taken from the accompanying claims.

BRIEF DESCRIPTION OF THE DRAWING

The invention will be described more specifically in the following with reference to the accompanying drawing which illustrates a compressed-air drier with a pair of drying towers which are embodied in accordance with the invention.

DESCRIPTION OF THE PREFERRED EMBODIMENT

The drawing shows two drying towers 1 and 2, respectively. The lower portions of these towers are interconnected by means of a conduit 3, in which two for example manually or electrically operable valves 4 and 5, respectively, are disposed. The upper portions of the drying towers 1 and 2 are interconnected by means of a conduit 6 including two check valves 7 and 8, respectively. A supply lead 9 for air to be dried connects to the lower connection line 3 of the towers, and a lead 10 for air that has been dried extends from the upper connection line or conduit 6 of the towers. A regenerating lead 11 is connected at the point wherein the lead 10 runs out from the line 6, said regenerating lead being connected over a fluxmeter 12 for regenerating air to one end of a cartridge 13 disposed in the drying tower 1 via a check valve 15 and to the other end of a cartridge 14 disposed in drying tower 2 via a check valve 16. Each cartridge 13 and 14 contains a heating coil 17 and 18, respectively, and at the opposite end to the air entrance end individual choke means generally designated 19 and 20, respectively, the design of which will be disclosed more specifically below. Tubes 21 and 22, respectively, for discharging regenerating air to the inner and upper portions of the towers as shown are connected behind the respective choke means. At the lower outsides of the drying towers there may for example be manually or electrically operable choke valves 23 and 24 for expelling regenerating air. As may be seen from the figure, the valves 23 and 24 are connected to the leads in which valves 4 and 5 are included. Furthermore, a safety valve 25 and 26, respectively, is allocated to each drying tower as a measure of precaution.

Drying towers 1 and 2 and the components connected thereto are mutually alike, which also applies to the choke means 19 and 20, and therefore only choke means 20 will be described more specifically. This choke means, which in reality is a valve, comprises an elongate pin 27 extending from the outside of the drying tower and into the heat cartridge 14. Said pin terminates with a conical surface 28, which may be made to more or less closely engage a corresponding conical surface 29 of an aperture for passing air in a disc 30 fit into cartridge 14 by means of a threaded connection 31 between one of the outer ends of the cartridge and a screw bushing 32, to which the pin 27 is attached. Thus, when the screw bushing 32 is rotated, the pin 27 will be made to move further in towards disc 30 and further out therefrom, respectively. By means of this choke arrangement the quantity of regenerating air may be controlled and may be maintained at for example 5% of the total amount of air conveyed through the drying towers. It should be noted that the cartridges to advantage may be located approximately centrally in the towers, i.e. somewhat lower than they are shown in the figure, and that perforated plates, which are indicated by the dashed lines 35, 36, 37 and 38, respectively, may be disposed above the cartridges but below the outlets of the respective tubes 21 and 22 and at the lower parts of said towers, respectively, with the purpose of enclosing drying agent between said plates for providing favorable flow of gas or air. Triangular sieves illustrated in the figure at the tops and bottoms, respectively, of the towers are then replaced by these perforated plates. The size and number of perforations in the plates are determined by the composition of the drying agent and its particle size.

The apparatus described above operates in the following manner. Compressed air which is to be dried prior to being supplied to for example compressed-air tools is fed to line 3 over lead 9, wherein valve 4 is assumed to be open, whereas valves 5 and 23 are closed. Thus, the compressed air will be introduced into drying tower 1 which contains an appropriate drying agent or hygroscopic mass, and it may exit at the upper portion of the tower and may be conveyed through lead 6 to outlet tube 10 for continued conveyance to the place of utilization, as check valve 7 will pass flow in the relevant direction, whereas check valve 8 blocks. Thus, tower 2 is completely disconnected with regard to any air flowing through it and being intended for being dried. However, if tower 2 has been utilized in the same manner as tower 1 previously, the drying agent of tower 2 will contain moisture, as this drying agent has absorbed moisture from the air to be dried which previously flowed through said tower. Therefore, the drying agent of tower 2 must be dried in some manner if this tower is to be utilized again for its intended purpose at high efficiency, and in accordance with the invention this is carried out as follows.

A predetermined amount of the air leaving drying tower 1 and being conveyed throuugh lead 6 passes through lead 11 and furthermore through fluxmeter 12 as well as through check valve 16 and into cartridge 14, as said check valve will pass flow directed towards said cartridge. Check valve 15 will simultaneously block air flow from fluxmeter 12. The quantity of regenerating air that is introduced into the heating cartridge may be controlled by screwing in and screwing out, respectively, the elongate pin 27, whereby it becomes possible to adjust the regenerating air to an appropriate amount in accordance with the indication of fluxmeter 12. An amount which in practice has proved to be appropriate is approximately 5% of the total amount of air flowing through drying tower 1. Heating the air for regeneration may be carried out under positive pressure in the heating cartridge.

The heating element 18 is operative in drying tower 2, which has the advantage that the air flowing in will be dried in the cartridge first and then in the drying tower by flowing around the outside of the cartridge 14 when said air has been conveyed via the choke means 20 and the tube 22 to the upper portion of drying tower 2 as shown and thereafter is conveyed downwardly and withdrawn through valve 24.

When this drying process has been going on for an appropriate time, for example one hour, said process is reversed by valve 4 being closed and valve 23 being opened simultaneously with valve 5 being opened and valve 24 being closed, whereby the air to be dried is conveyed through the drying tower 2 and is carried further on in the form of dried air through lead 10 for utilization, whereas the regenerating air is conveyed from the point of interconnection of leads 6 and 10 and via lead 11 to the interior of the heating cartridge 13. Herein it is presupposed that check valve 8 will let air pass from drying tower 2 towards leads 10 and 11, whereas check valve 7 is blocked with regard to flow towards drying tower 1. Also, check valve 15 will now permit flow from fluxmeter 12 to cartridge 13, whereas check valve 16 blocks flow from fluxmeter 12 to cartridge 14.

Each one of the respective cartridges 13 and 14 is provided with an individual thermostat 33 and 34, respectively, for controlling the temperatures of the cartridges.

The invention is not restricted to the embodiments described above and illustrated in the drawing, and these embodiments may be modified within the scope of the invention. For example, more than two drying towers may be utilized in the same system and the regeneration may be carried out to different extents in the various drying towers.

What is claimed is:

1. Apparatus for regenerating a drying agent in driers for gas under positive pressure, said apparatus comprising
   a. two drying towers, each tower having upper and lower ends, respectively,
   b. a drying agent disposed in each of said drying towers,
   c. means for interconnecting said drying towers by their respective upper ends and lower ends,
   d. valve means in said interconnecting means,
   e. means for supplying to one of said interconnecting means compressed gas to be dried,
   f. means for expelling from the other of said interconnecting means dried compressed gas, g. hollow cartridge means extending diametrically through each of said drying towers, said cartridge having choke means at the output thereof, h. heating means disposed in each of said cartridge means, i. feedback means from the interconnectng means for expelling dried compressed gas from each of said drying towers to the respective cartridge means, and j. valve means in said feedback means, whereby moist, compressed gas introduced at one end of a first one of said drying towers is expelled at the other end of said drying tower and a lesser portion of this dried gas is fed back as regenerating gas to the cartridge means of the second drying tower and heated therein and is discharged from said cartridge means through said choke means for flowing through the entire drying agent of the second drying tower for drying said drying agent of the second drying tower.

2. Apparatus in accordance with claim 1, wherein said choke means in each of said cartridges controls the flow of compressed gas therefrom.

3. Apparatus in accordance with claim 2, wherein said choke means is located at the opposite end of said heating cartridge as compared to the input end for the regenerating gas, said choke means comprising a tapered pin adapted to be threaded into and threaded out of, respectively, an aperture in a blocking disc for controlling the amount of regenerating gas flowing through said aperture.

4. Apparatus in accordance with claim 1, wherein said regenerating gas is discharged from said cartridge means through said choke means at one end of the drying tower for flowing through the drying agent in the drying tower to the other end of the drying tower prior to being expelled from the drying tower.

5. Apparatus in accordance with claim 1, wherein said cartridge means is disposed approximately centrally in the bed of drying agent.

6. Apparatus in accordance with claim 1, wherein perforated, substantially horizontal plates are disposed immediately below the discharge openings of the cartridge means at one end of the drying towers, and perforated, substantially horizontal plates are disposed at the other ends of the drying towers, with the drying agent disposed between said horizontal plates in each tower.

7. Apparatus in accordance with claim 1, wherein the regenerating gas is heated under positive pressure in said cartridge means and is controlled by said choke means.

* * * * *